United States Patent
Karydas

Patent Number: 5,260,400
Date of Patent: Nov. 9, 1993

[54] FLUORINE AND SILICON CONTAINING WATER AND OIL REPELLENTS

[75] Inventor: Athanasios Karydas, New York, N.Y.

[73] Assignee: Dynax Corporation, Elmsford, N.Y.

[21] Appl. No.: 996,015

[22] Filed: Dec. 23, 1992

[51] Int. Cl.$^5$ ............................................. C08G 77/04
[52] U.S. Cl. .................................... 528/25; 528/26; 525/479
[58] Field of Search ................... 528/25, 26; 525/479

[56] References Cited

U.S. PATENT DOCUMENTS 4,098,742  7/1978  Mueller .................. 525/474
4,605,712  8/1986  Mueller et al. ........... 525/479

Primary Examiner—Melvyn I. Marquis

[57] ABSTRACT

The present invention relates to silicone and perfluoroalkyl group containing telomers of the formulae

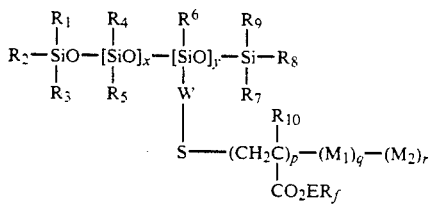

-continued
and

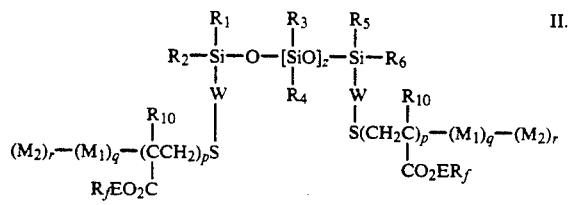

wherein $R_f$ is a straight or branched chain perfluoroalkyl up to 18 carbon atoms or said perfluoroalkyl substituted by perfluoroalkoxy of 2 to 6 carbon atoms, or mixtures thereof; W and E are divalent linking groups; $R_1$, $R_2$, $R_3$, $R_4$, $R_5$, $R_6$, $R_7$, $R_8$, and $R_9$ are straight or branched chain alkyl of up to 18 carbon atoms, optionally interrupted by —O—, —S—, —SO$_2$— or substituted by halogen or glycidyl groups; $R_{10}$ is hydrogen or lower alkyl; ($M_1$) represents a monomer unit derived from monomer $M_1$ which is water soluble with more than 20% solubility in water at 25° C.; ($M_2$) represents a monomer unit derived from monomer $M_2$ which is water insoluble with less than 2% solubility in water at 25° C.; x and z are integers from 10 to 500; y is an integer from 1 to 25; p is an integer from 1 to 500 and q and r are integers from 0 to 250.

These compositions are useful as coatings on glass, paper, wood, leather and especially textiles.

22 Claims, No Drawings

FLUORINE AND SILICON CONTAINING WATER AND OIL REPELLENTS

BACKGROUND OF THE INVENTION

Fluorine containing polymers have been extensively used to make oil and water repellent coatings on various substrates, primarily on textiles.

Polyaddition polymers as well as polycondensates have been prepared for this purpose. The perfluoroalkyl groups of these polymers impart such low free surface energies to coated surfaces that not only water, but also organic liquids are unable to wet them. Heptane, for instance, with a surface tension of 17 [dynes/cm] will not wet a coating with a surface energy lower than that; surfaces consisting of more or less densely packed perfluoroalkyl groups have free surface energies between 10 and 15 [dynes/cm]. Only very small amounts of fluorine are needed to prepare such surfaces. Therefore, perfluoroalkyl group-containing textile finishes have, despite their greater material cost, replaced to a great extent silicone based water repellents for textile applications.

Silicone based water repellents have, up to the arrival of fluorochemicals, dominated the market of water repellents have, up to the arrival of fluorochemicals, dominated the market of water repellents for textiles. They are still used in applications where only water repellency, no oil repellency, is important and where the exceptionally smooth hand they impart is desired.

Attempts to combine both types of finishes in one application with the goal to get high oil and water repellency together with a soft, smooth hand, have failed, because of the inherent incompatibility of $R_f$-substituted polymers and polysiloxanes in combination textile finishes. In such combinations of the art, the oil repellency of the fluoropolymer was lost or seriously diminished by combination with silicones.

The combination of siloxane units and fluorine in one molecule for textile applications has been described in U.S. Pat. Nos. 3,331,813 and 3,903,128. In both cases, Si and F are combined in one monomeric unit and fluoroalkyl groups are attached directly to a polysiloxane backbone, covering up in effect the Si atoms. As a result, neither oil repellency nor water repellency is optimized. U.S. Pat. No. 4,098,742 describes polyurethanes which contain at least one segment derived from a perfluoroalkyl-substituted diol and at least one segment derived from a reactive hydrogen containing polysiloxane, synthesized by co-polycondensation with an organic diisocyanate. Polyurethanes of this type, however, are known not to possess the thermal stability required for some textile applications.

It is an object of the present invention to provide thermally stable polysiloxane and fluoroalkyl containing telomers. It is a further object of the present invention to provide oleophobic and hydrophobic coatings of such telomers on substrates particularly glass, ceramic, masonry, wood, paper, metal, leather and preferably textile substrates, to which such coatings impart a high degree of oil repellency, water repellency and soft hand.

DETAILED DESCRIPTION OF THE INVENTION

The present invention relates to silicone and perfluoroalkyl group containing telomers of the formulae

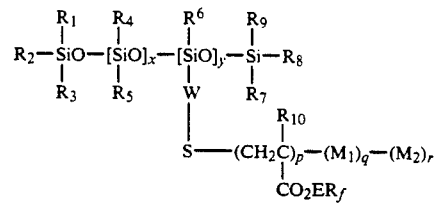

and

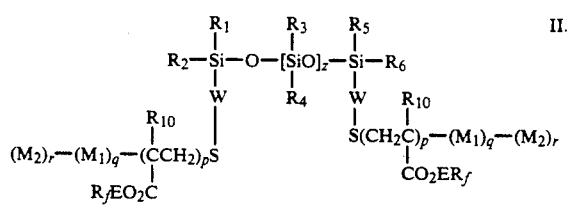

wherein $R_f$ is a straight or branched chain perfluoroalkyl up to 18 carbon atoms or said perfluoroalkyl substituted by perfluoroalkoxy of 2 to 6 carbon atoms, or mixtures thereof;

W is straight or branched chain alkylene of 1 to 10 carbon atoms or said alkylene interrupted by one to three groups independently selected from the group consisting of —NR—, —O—, —S—, —COO—, —OOC—, —CONR—, —NRCO—, —SO$_2$NR— and —NRSO$_2$—, and optionally substituted by hydroxy, halogen or alkoxy groups;

E is straight or branched chain alkylene of 1 to 10 carbon atoms or said alkylene interrupted by one to three groups independently selected from the group consisting of —NR—, —O—, —S—, —COO—, —OOC—, —CONR—, —NRCO—, —SO$_2$NR—, —NHCO$_2$—, —NHCOS— and —NRSO$_2$—, or terminated at the $R_f$ end with —CONR— or —SO$_2$NR— where such $R_f$ is attached to the respective carbonyl carbon or sulfur atom thereof and wherein R is independently hydrogen, alkyl of 1 to 6 carbon atoms or hydroxyalkyl of 2 to 6 carbon atoms;

$R_1$, $R_2$, $R_3$, $R_4$, $R_5$, $R_6$, $R_7$, $R_8$, and $R_9$ are straight or branched chain alkyl of up to 18 carbon atoms, optionally interrupted by —O—, —S—, —SO$_2$—; or substituted by halogen or glycidyl groups;

$R_{10}$ is hydrogen or lower alkyl;

($M_1$) represents a monomer unit derived from monomer $M_1$ which is water soluble with more than 20% solubility in water at 25° C.;

($M_2$) represents a monomer unit derived from monomer $M_2$ which is water insoluble with less than 2% solubility in water at 25° C.;

x and z are integers from 10 to 500;

y is an integer from 1 to 25;

p is an integer from 1 to 500 and q and r are integers from 0 to 250.

The telomeric compositions of formulae I and II can be readily synthesized by reacting, in the presence of a radical initiator, mercaptoalkyl substituted polysiloxanes of formulae

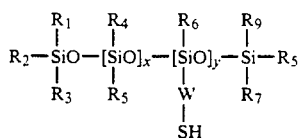  III.

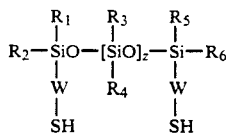  IV.

with fluorinated (meth)acrylates of formula

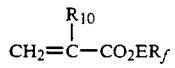  V.

and monomers of the type $M_1$ and $M_2$.

The mercaptoalkyl substituted polysiloxanes of formulae III and IV are commercially available or can be readily synthesized from commercially available functional polysiloxanes as shown in schemes IA-IIIA Scheme IA

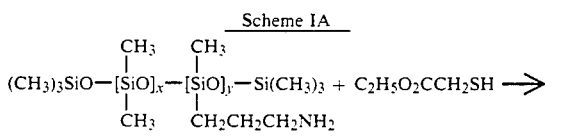

Scheme IIA

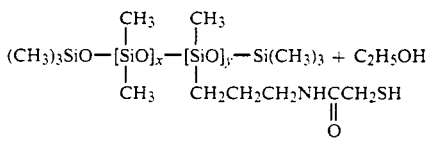

Scheme IIIA

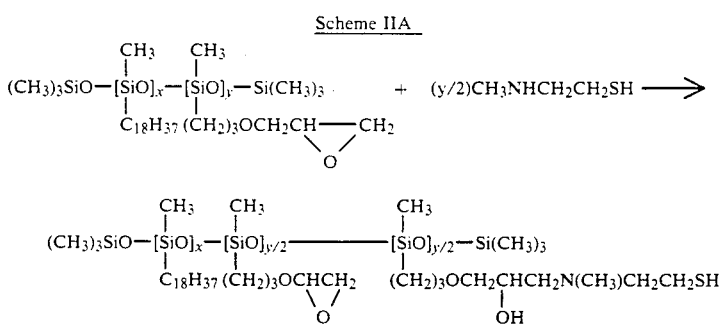

The following are examples of commercially available mercaptoalkyl substituted polysiloxanes

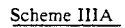
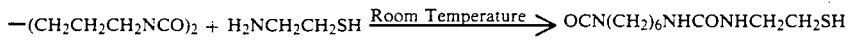
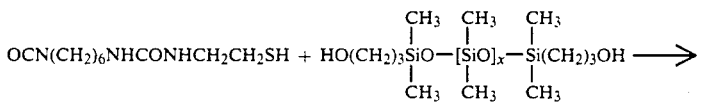
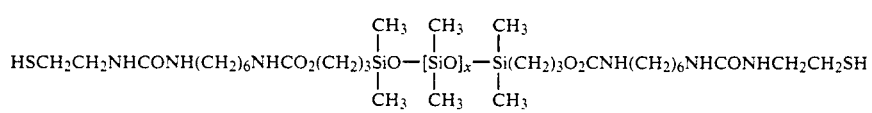

The most preferred compositions of formulae III and IV are the ones wherein:
$R_1$, $R_2$, $R_3$, $R_4$, $R_5$, $R_6$, $R_7$, $R_8$ and $R_9$ are alkyl of up to 20 carbon atoms;
W is alkylene from 2 to 5 carbon atoms;
x and z are integers from 20 to 200 and
y is 1 to 8.

Perfluoroalkyl containing (meth)acrylates of formula V include $CF_3(CF_2)_4CH_2OCOC(CH_3)=CH_2$
$CF_3(CF_2)_6(CH_2)_2OCOC(CH_3)=CH_2$
$CF_3(CF_2)_7(CH_2)_2OCOCH=CH_2$
$CF_3CF_3CF(CF_2)_5(CH_2)_2OCOCH=CH_2$
$CF_3(CF_2)_8(CH_2)_2OCOCH=CH_2$
$CF_3(CF_2)_8(CH_2)_2OCOC(CH_3)=CH_2$
$CF_3(CF_2)_7SO_2N(C_3H_7)(CH_2)_2OCOCH=CH_2$
$CF_3(CF_2)_7(CH_2)_4OCOCH=CH_2$
$CF_3(CF_2)_7SO_2N(CH_3)(CH_2)_2OCOC(CH)=CH_2$
$CF_3(CF_2)_7SO_2N(C_2H_5)(CH_2)_2OCOCH=CH_2$
$CF_3(CF_2)_7CONH(CH_2)_2OCOCH=CH_2$
$CF_3CF_3CF(CF_2)_6(CH_2)_3OCOCH=CH_2$ CH$_2$=CHCO$_2$CH$_2$CH$_2$S CH$_2$CH$_2$C$_8$F$_{17}$
CH$_2$=C(CH$_3$)CO$_2$CH$_2$CH$_2$NHCO$_2$CH$_2$CH$_2$C$_8$F$_{17}$
CH$_2$=CHCO$_2$CH$_2$CH$_2$CH$_2$SO$_2$CH$_2$CH$_2$C$_8$F$_{17}$ Preferably the monomers of formula V are those where
- $R_f$ is perfluoroalkyl of 4 to 12 carbon atoms or perfluoroalkyl of 2 to 6 carbon atoms substituted by perfluoroalkoxy of 2 to 6 carbons;
- E is alkylene of 2 to 6 carbon atoms, —CONHCH$_2$CH$_2$—, —CH$_2$CH$_2$N(CH$_3$)CH$_2$CH$_2$—, —CH$_2$CH$_2$SO$_2$NRCH$_2$CH$_2$—, —CH$_2$CH$_2$OCH$_2$CH$_2$— or —SO$_2$NRCH$_2$CH$_2$—, wherein R is hydrogen, methyl or ethyl and
- $R_{10}$ is hydrogen or methyl.

Most preferred are monomers of formula V where
- $R_f$ is perfluoroalkyl of 6 to 12 carbon atoms,
- E is ethylene and
- $R_{10}$ is hydrogen or methyl.

Water soluble monomers of the type $M_1$ are well known and include water soluble derivatives of acrylic and/or methacrylic acid, such as hydroxalkyl esters of acrylic acid or methacrylic acid, where alkyl is 2 to 4 carbon atoms, e.g., 2-hydroxyethyl, 3-hydroxypropyl, 2-hydroxypropyl or 2,3-dihydroxypropyl esters; also ethoxylated and polyethoxylated hydroxyalkyl esters such as esters of alcohols of the formula HO—C$_m$H$_m$—O—(CH$_2$CH$_2$—O)$_n$—H where
- m represents 2 to 5 and
- n represents 1 to 20 or esters of analogous alcohols, wherein a part of the ethylene oxide units is replaced by propylene oxide units. Also suitable are 3-(dimethylamino)-2-hydroxypropyl esters and amides. Another class of suitable derivatives of such acids are their water-soluble amides, such as unsubstituted amides and amides substituted by lower hydroxyalkyl, lower oxaalkyl or lower dialkylaminoalkyl groups where alkyl is 2 to 4 carbon atoms such as N-(hydroxymethyl)-acrylamide and-methacrylamide, N-(3-hydropropyl)-acrylamide, N-(2-hydroxyethyl)methacrylamide and N-[1,1-dimethyl-2-(hydroxymethyl)-3-oxabutyl]acrylamide; water-soluble hydrazine derivatives such as dimethyl-2-hydroxypropylamine methacrylimide and the corresponding derivatives of acrylic acid.

Also useful, in combination with comonomers, are the lower hydroxyalkyl maleic esters and vinyl ethers where alkyl is 2 to 4 carbon atoms, for instance, di-(hydroxyalkyl) maleates, such as di-(2-hydroxyethyl) maleate, and ethoxylated hydroxyalkyl maleates, hydroxyalkyl monomaleates, such as 2-hydroxyethyl monomaleate and alkoxylated hydroxyalkyl monomaleate with vinyl ethers, vinyl esters, styrene or generally any monomer which will easily copolymerize with maleates or fumarates; hydroxyalkyl vinyl ethers, such as 2-hydroxyethyl vinyl ether, 4-hydroxybutyl vinyl ether, with maleates, fumarates, or generally all monomers which will easily copolymerize with vinyl ethers.

Water-soluble monomers of the type $M_1$, which do not contain hydroxy groups are: acrylic and methacrylic acid and alkyl ethers of polyethoxylated hydroxyalkylesters thereof, such as esters of alcohols of the formula HO—C$_m$H$_{2m}$—O—(CH$_2$CH$_2$—O)$_n$—CH$_3$ where
- m=2 to 5 and
- n=4 to 20.

Dialkyl amino alkyl esters and amides, such as 2-(dimethylamino)ethyl or 2-(diethylamino)ethyl acrylate and methacrylate, as well as the corresponding amides; amides substituted by lower oxa-alkyl or lower dialkylamino alkyl groups, such as N-(1,1-dimethyl-3-oxabutyl)acrylamide; water-soluble hydrazine derivatives, such as trialkylamine methacrylimide, e.g., triethylamine-methacrylimide and the corresponding derivatives of acrylic acid. Monoolefinic sulfonic acids and their salts, such as sodium ethylene sulfonate, sodium styrene sulfonate and 2-acrylamido-2-methylpropanesulfonic acid; or monoolefinic derivatives of heterocyclic nitrogen-containing monomers, such as N-vinylpyrrole, N-vinyl succinimide, 1-vinyl-2-pyrrolidone, 1-vinylimidazole, 1-vinylindole, 2-vinylimidazole, 4(5)-vinylimidazole, 2-vinyl-1-methylimidazole, 5-vinylpyrazoline, 3-methyl-5-isopropenylpyrazole,5-methylenehydantoin,3-vinyl-2-oxazolidone,3-methacrylyl-2-oxazolidone, 3-methacrylyl-5-methyl-2-oxazolidone, 3-vinyl-5-methyl-2-oxazolidone, 2- and 4-vinylpyridine, 5-vinyl-2-methylpyridine, 2-vinylpyridine-1-oxide, 3-isopropenylpyridine, 2- and 4-vinylpiperidine, 2- and 4-vinylquinoline, 2,4-dimethyl-6-vinyl-s-triazine and 4-acrylylmorpholine.

Preferred monomers of the type $M_1$ include acrylic and methacrylic acid derivatives such as their hydroxyalkyl esters, e.g., 2-hydroxyethyl, 3hydroxypropyl, 2hydroxypropyl or 2,3-dihydroxypropyl esters.

Another class of preferred monomers are acrylamides and methacrylamides substituted by lower hydroxyalkyl groups such as N-(hydroxymethyl)-acrylamide and -methacrylamide, N-(3-hydroxypropyl)-acrylamide, N-(2-hydroxyethyl)-methacrylamide, and N-[1,1-dimethyl-2-(hydroxymethyl)-3-oxabutyl)]-acrylamide.

The most preferred monomers of the type $M_1$ are hydroxyalkyl (meth)acrylates, N-methylol (meth)acrylamides and N-methylol diacetone acrylamide.

The above listed monomers of type $M_1$ can be used alone or in combination with each other as well as in combination with suitable monomers of type $M_2$.

Monomers of the type $M_2$ are known per se and include acrylates, methacrylates, maleates, fumarates and itaconates with one or more carbons in the ester group, such as methyl, ethyl, propyl, isopropyl, butyl, hexyl, octyl, decyl, dodecyl, 2-ethylhexyl, octadecyl, cyclohexyl, phenyl, and benzyl;

Vinyl esters with 1 to 18 carbons in the ester group, such as vinyl acetate, butyrate, laurate, stearate, 2-ethylhexanoate and benzoate; vinyl chloracetate and isopropenyl acetate;

Styrene and substituted styrenes such as o- and p-methyl, 3,4dimethyl, 3,4-diethyl and p-chlorostyrene; alpha olefins which include substituted alpha olefins both straight and branched with up to 18 carbon atoms in the side chain including ethylene, propylene and butylene;

Methyl vinyl ether, isopropyl vinyl ether, isobutyl vinyl ether, 2-methoxyethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, n-decyl vinyl ether, n-tetradecyl vinyl ether, and n-octadecyl vinyl ether;

Vinyl chloride, vinylidene chloride, vinyl fluoride, vinylidene fluoride, acrylonitrile, methacrylonitrile, tetrafluoroethylene, trifluorochlororoethylene, hexafluoropropylene;

Dienes particularly 1,3-butadiene, isoprene, and chloroprene, 2-fluoro-butadiene, 1,1,3trifluorobutadiene, 1,1,2,3-tetrafluorobutadiene, 1,1,2-trifluoro-3,4-dichlorobutadiene and tri- and pentafluorobutadiene and isoprene.

The most preferred monomers of the type $M_2$ are (meth)acrylates derived from alcohols of up to 20 carbon atoms, vinyl chloride, vinylidene chloride and chloroethyl vinyl ether.

The above listed monomers of type $M_2$ can be used alone or in combination with each other as well as in combination with suitable monomers of type $M_1$.

In order to prepare the telomers of this invention, various types and conditions of polymerization reactions can be employed. Any of the mass polymerization, solution polymerization, suspension polymerization and emulsion polymerization techniques can be employed. For example, a mixture of the monomers is emulsified in water in the presence of a surface active agent and then telomerized with stirring. Telomerization initiators that can be used in the reaction medium include benzoyl peroxide, lauroyl peroxide, t-butyl perbenzoate, 1-hydroxy cyclohexyl hydroperoxide, 3-carboxypropionyl peroxide, acetylperoxide, azobis-isobutylamidine-2-hydrochloride, azobisisobutyronitrile, sodium peroxide, potassium persulfate and ammonium persulfate.

The surface active agent used is selected from many types of anionic, cationic and nonionic emulsifiers. Suitable anionic emulsifiers include sodium $C_{16-18}$ alkenyl sulfate acetate, sodium oleate, sodium oleate methysulfate, ammonium omega-H-polyfluoro-alkanoate containing 8–10 carbon atoms, ammonium fluoroalkanoate, sodium $C_{10-18}$ alkylsulfate, sodium $C_{12-18}$ alkylbenzenesulfonate and sodium alkylnaphthalenesulfate. Suitable cationic emulsifiers include benzyl dodecyl dimethyl ammonium chloride, N-[2-(diethylamino)ethyl]-oleylamide hydrochloride, dodecyltrimethyl ammonium acetate, trimethyl tetradecyl ammonium chloride, hexadecyl trimethyl ammonium chloride and trimethyl octadecyl ammonium chloride. Suitable nonionic emulsifiers include polyoxyethylene hexylphenol, isooctylphenol, nonylphenol, $C_{12-18}$ higher fatty alcohol ethers, polyoxyethylene $C_{12-18}$ higher fatty acid esters, polyoxyethylene $C_{12-18}$ alkanethiol, polyoxyethylene $C_{12-18}$ alkylamine, and polyoxyethylene sorbitane alkanoate.

The monomers may be dissolved in a suitable organic solvent, and the polymerization conducted in solution in the presence of a polymerization initiator such as a soluble peroxide or an azo compound. Suitable organic solvents include tetrachlorodifluoroethane, methylchloroform, and the like. Various aerosol, organic solvent type or latex type oil-and water-repellent compositions can be directly prepared by solution polymerization or emulsion polymerization.

The oil- and water-repellent compositions containing the telomers can be prepared as an emulsion, a solution, an aerosol, etc. by any conventional method. For example, an aqueous emulsion composition can be directly prepared by emulsion polymerization, and a solution composition can be directly prepared by solution polymerization. Solution compositions can also be prepared by dissolving the telomer prepared by mass polymerization or emulsion polymerization in a suitable organic solvent such as acetone, methylethylketone, diethyl ether, methylchloroform, trichloroethylene, tetrachloroethylene, chlorofluorohydrocarbons such as tetrachlorodifluoroethane, trichlorotrifluoroethane, or mixtures thereof. Aerosol compositions can also be prepared by packing a solution of the composition with a propellant such as dichlorodifluoromethane, monofluorotrichloromethane, dichlorotetrafluoroethane, and the like in a can.

The oil- and water-repellent compositions of this invention can be applied by various methods depending upon the form of the composition and the type of articles treated. For example, when the composition is an aqueous emulsion or a solution composition, the composition is coated on the surface of an article by a conventional dip coating method or any other coating method and is dried. If necessary, certain cross-linking agents may be added to cure the composition. If the oil- and water-repellent composition is used as an aerosol, it may be sprayed on an article and dried to leave a satisfactory oil-, water- and stain-repellent article.

It is possible to apply the oil- and water-repellent compositions of this invention together with other water-repellent compositions and oil-repellent compositions containing insecticides, flame proofing agents, anti-electrostatic agents, dye fixing agents, shrinkproofing agents, and the like. The types of articles treated by the oil- and water-repellent compositions of this invention are not limited, and can be fibrous fabrics, glass, paper, wood, leather, wool, asbestos, rick, cement, metal, metal oxides, ceramics, plastics, coating surfaces and plaster. The fibrous fabric can be made of natural fibers such as cotton, hemp, wool, silk; synthetic fabrics such as polyamide, polyesters, polyvinylalcohols, polyacrylonitriles, polyvinylchlorides, polypropylenes, polytetrafluoroethylenes; semi-synthetic fibers such as rayon, acetate and glass fibers; and mixtures thereof.

TEST METHODS

The AATCC water spray test rating was determined according to Standard Test method 22-1985 of the American Association of Textile Chemists and Colorists, Volume 61, 1986 (also designed ASTM-D-583-58). Ratings are given from 0 (minimum) to 100 (maximum).

The AATCC Oil Rating was determined according to Standard Test method 118-1983 of the American Association of Textile Chemists and Colorists. Ratings are given from 0 (minimum) to 8 (maximum). A commonly accepted level of repellency for oil repellent fabrics in the United States is an oil repellency of 4.

All mentioned AATCC Tests are listed in the Technical manual of the American Association of Textile Chemists and Colorists, Volume 61, edition 1986.

The comparative hand evaluations were conducted according to AATCC Evaluation procedure 5 listed in page 337 of the Technical manual of the American Association of Textile Chemists and Colorists, Volume 67, edition 1992. The following rating method was used:

A rating of − indicates that the treated fabric feels harsher than the untreated fabric.

A rating of 0 indicates that the treated fabric feels the same as the untreated fabric.

A rating of + indicates that the treated fabric feels softer than the untreated fabric.

A rating of + + indicates that the treated fabric feels such softer than the untreated fabric.

Telomers and telomer blends dissolved in non-aqueous medium may be applied to fabric by known methods much as padding or spraying processes. The fabric is cured at 180° C. for 2 minutes.

Telomers and telomer blends prepared in water or a water-solvent mixture or a solvent which are water-miscible may be applied to fabric by padding from an aqueous pad bath optionally containing permanent press resins, catalyst and additives (so-called permanent press recipe).

After padding, the fabric is dried at 100° C. for 2 minutes and cured at 163° C. for 5 minutes.

EXAMPLE 1

A monomer emulsion prepared from:

| 99 g | $R_fCH_2CH_2O_2CCH=CH_2$ ($R_f$: $C_9F_{19}$ average) |
| --- | --- |
| 63 g | $(CH_3)_3SiO-[SiO]_{88}-[SiO]_2Si(CH_3)_3$ with $CH_3$ and $(CH_2)_3SH$ side groups |
| 5.8 g | vinylidene chloride |
| 5.8 g | butyl methacrylate |
| 3 g | N-methylol acrylamide |
| 120 g | acetone |
| 640 g | deionized water |
| 4.1 g | dicocodimethyl ammonium chloride |
| 8 g | 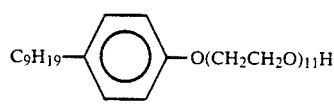 | was placed in an autoclave with 0.4 g of 2,2′ Azobis [N,N′dimethylene isobutyl amidine]dihydrochloride and allowed to polymerize at 55° C. for 10 hours to yield an emulsion of good quality. Evaporation of the solvent gave a smooth white film which is soft and waxy but not sticky. NMR analysis showed only a trace of residual monomers.

EXAMPLE 2

A monomer solution prepared from:

| 55 g | $R_fCH_2CH_2O_2CCH=CH_2$ ($R_f$: $C_9F_{19}$ average) |
| --- | --- |
| 45 g | $(CH_3)_3SiO-[SiO]_{38}-[SiO]_2-Si(CH_3)_3$ with $CH_3$/$C_{18}H_{37}$ and $(CH_2)_3SH$ side groups |
| 380 g | butyl acetate | was placed in a round bottom flask and purged with nitrogen and heated to 80° C. Azo bis isobutyronitrile (0.25 g) was dissolved in 20 g of butyl acetate and the solution was added to the monomer mixture over 2 hours. At the end of the initiator addition the solution was held at 75° C. with rapid stirring for an additional 10 hours. Evaporation of the solvent gave a white wax with no unsaturation as determined by NMR spectroscopy.

EXAMPLE 3

A monomer solution prepared from

| 60 g | $R_fCH_2CH_2O_2CCH=CH_2$ ($R_f$: $C_9F_{19}$ average) |
| --- | --- |
| 20 g | $HS(CH_2)_3SiO-[SiO]_{43}-Si(CH_2)_3SH$ with $CH_3$ side groups |
| 20 g | stearyl methacrylate |
| 220 g | butyl acetate | was polymerized according to the procedure outlined in Example 2. Evaporation of the solvent gave a soft, clear, non-tacky film. NMR analysis did not reveal any residual monomers.

EXAMPLE 4

A monomer emulsion prepared from

| 65 g | $R_fCH_2CH_2O_2CCH=CH_2$ ($R_f$: $C_9F_{19}$ average) |
| --- | --- |
| 25 g | $(CH_3)_3SiO-[SiO]_{110}-[SiO]_2-Si(CH_3)_3$ with $CH_3$ and $(CH_2)_3SH$ side groups |
| 10 g | Stearyl methacrylate |
| 50 g | Acetone |
| 350 g | Deionized water |
| 2 g | Dicocodimethyl ammonium chloride |
| 4 g | 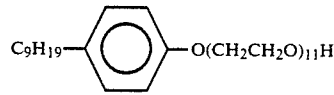 |
| 0.2 g | Acetic acid | was placed in a round bottom flask and 0.5 g of 2,2′-Azobis (N,N′dimethylene isobutylamidine) dihydrochloride were added. The flask was purged with nitrogen and the monomer emulsion was polymerized at 60° C. for 10 hours with slow agitation. Evaporation of the solvent gave a smooth, white film. NMR analysis showed no unsaturation.

EXAMPLE 5

A monomer emulsion prepared from

| 57 g | $R_fCH_2CH_2O_2CCH=CH_2$ ($R_f$: $C_9F_{19}$ average) |
| --- | --- |
| 32 g | $(CH_3)_3SiO-[SiO]_{70}-[SiO]_2-Si(CH_3)_3$ with $CH_3$ and $(CH_2)_3SH$ side groups |
| 8 g | Stearyl methacrylate |
| 1.5 g | 2-hydroxyethyl methacrylate |
| 1.5 g | N-methylol acrylamide |
| 67 g | Acetone |
| 330 g | deionized water |
| 2 g | dicocodimethyl ammonium chloride |
| 4 g | 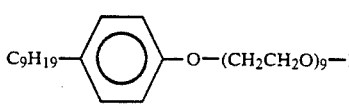 | was polymerized according to the procedure described in Example 1. Evaporation of the solvent gave a soft, waxy film. NMR analysis showed only a trace of residual monomers.

EXAMPLES 6-8

The following examples are comparative and demonstrate the differences between the compounds of the instant invention and commercially available fluoropolymers and silicones.

COMPARATIVE EXAMPLE 6

The compound of Example 2 and Scotchgard FC-905 (a 10% fluoropolymer solution in methylchloroform, containing 3.23% fluorine and available from the 3M Company) were each diluted to 0.3% fluorine with isopropyl acetate and applied to polyester microfiber by padding; the wet pick up was 50% and the fabrics were dried and cured at 180° C. for 2 minutes. Evaluation results are summarized in Table 1.

TABLE 1

| COMPOUND | AATCC OIL | AATCC SPRAY | HAND |
|---|---|---|---|
| Example 2 | 6 | 100 | + |
| Scotchgard FC 905 | 6 | 100 | 0 |

The results indicate that the compound of Example 2 can impart soft hand without compromising water or oil repellency.

COMPARATIVE EXAMPLE 7

Milease F-48, a fluorochemical textile finish imparting soft hand (a 20% solids fluorochemical emulsion containing 6.8% fluorine and available from ICI) and DC 108 (an aminofunctional polydimethylsiloxane softener emulsion available from Dow Corning) were blended to give an emulsion containing equal amounts of fluorochemical and siloxane. The resulting emulsion was then diluted with water to 0.2% fluorine. The compound of Example 4 and Milease F-48 were each diluted with water to 0.2% fluorine. DC-108 was diluted with water to 1% solids. The four aforementioned diluted emulsions were applied to polyester microfiber by padding; the wet pick up was 50% and the fabrics were dried and cured at 180° C. for 2 minutes. Evaluation results were summarized in Table 2.

TABLE 2

| COMPOUND | AATCC OIL | AATCC SPRAY | HAND |
|---|---|---|---|
| Example 4 | 6 | 100 | ++ |
| Milease F-48 | 6 | 100 | + |
| DC-108 | 0 | 100 | ++ |
| Milease F-48/DC 108 Blend | 1-2 | 100 | ++ |

The results indicate that the compound of Example 4 imparts both soft hand and a high degree of water and oil repellency where as, the oil repellency of conventional fluoropolymers is diminished when they are blended with silicones to enhance the hand.

COMPARATIVE EXAMPLE 8

Zonyl 7040 (a 17% solids fluorochemical emulsion containing 6% fluorine and available from DuPont) and Aridry SN 50 (a methyl hydrogen silicone emulsion available from CNC, Inc.) were blended to give an emulsion containing equal amounts of fluorochemical and silicone. Arifix NS (a zinc stearate fixative for Aridry SN 50 available from CNC, Inc.) was added so the ratio of Aridry SN 50 to Arifix NS was 3 to 1. The resulting emulsion was diluted with water to 0.3% fluorine.

One part of Arifix NS was added to 3 parts of Aridry SN 50 and the emulsion was diluted with water to 1.5% solids.

The compound from Example 5 and Zonyl 7040 were each diluted with water to 0.3% fluorine.

The four aforementioned emulsions were applied to cotton poplin by padding; the wet pick up was 80% and the fabrics were dried at 100° C. for 2 minutes and cured at 163° C. for 5 minutes.

Evaluation results are summarized in Table 3

TABLE 3

| COMPOUND | AATCC OIL | AATCC SPRAY | HAND |
|---|---|---|---|
| Example 5 | 6 | 100 | + |
| Zonyl 7040 | 6 | 100 | − |
| Aridry SN 50 | 0 | 100 | + |
| Zonyl 7040/Aridry SN 50 Blend | 3 | 100 | 0 |

The results indicate that, contrary to the commercially available products, the compounds of Example 5 imparts both soft hand and a high degree of water and oil repellency.

What is claimed is:

1. Silicon and fluorine containing compounds of formulae

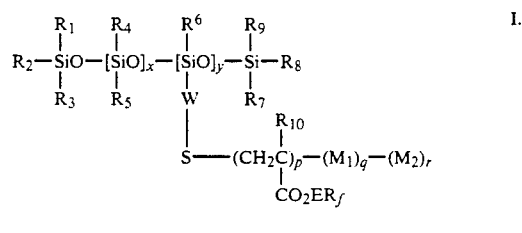

or

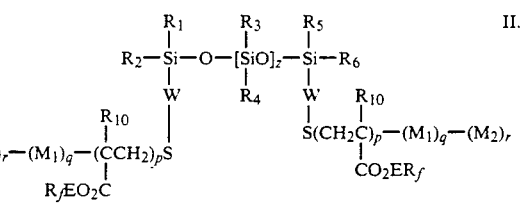

wherein $R_f$ is a straight or branched chain perfluoroalkyl up to 18 carbon atoms or said perfluoroalkyl substituted by perfluoroalkoxy of 2 to 6 carbon atoms, or mixtures thereof;

W is straight or branched chain alkylene of 1 to 10 carbon atoms or said alkylene interrupted by one to three groups independently selected from the group consisting of —NR—, —O—, —S—, —COO—, —OOC—, —CONR—, —NRCO—, —SO₂NR— and —NRSO₂—, and optionally substituted by hydroxy, halogen or alkoxy groups;

E is straight or branched chain alkylene of 1 to 10 carbon atoms or said alkylene interrupted by one to three groups independently selected from the group consisting of —NR—, —O—, —S—, —COO—, —OOC—, —CONR—, —NRCO—, —SO₂NR—, —NHCO₂—, —NHCOS— and —NRSO₂—, or terminated at the $R_f$ end with —CONR— or —SO₂NR— where such $R_f$ is attached to the respective carbonyl carbon or sulfur atom thereof; and wherein R is independently hydrogen, alkyl of 1 to 6 carbon atoms or hydroxyalkyl of 2 to 6 carbon atoms;

$R_1$, $R_2$, $R_3$, $R_4$, $R_5$, $R_6$, $R_7$, $R_8$, and $R_9$ are straight or branched chain alkyl of up to 18 carbon atoms, optionally interrupted by —O—, —S—, —SO$_2$—; or substituted by halogen or glycidyl groups;

$R_{10}$ is hydrogen or lower alkyl;

($M_1$) represents a monomer unit derived from monomer $M_1$ which is water soluble with more than 20% solubility at 25° C. and ($M_2$) represents a monomer unit derived from monomer $M_2$ which is water insoluble with less than 2% solubility in water at 25° C.;

x and z are integers from 10 to 500;

y is an integer from 1 to 25;

p is an integer from 1 to 500 and q and r are integers from 0 to 250.

2. Compounds of claim 1 wherein $R_1$, $R_2$, $R_3$, $R_4$, $R_5$, $R_6$, $R_7$, $R_8$, and $R_9$ are alkyl of up to 18 carbon atoms;

W is alkylene with 2 to 5 carbon atoms;

$M_1$ is a hydroxy containing monomer with molecular weight lower than 200;

x and z are integers from 10 to 200 and y is 1 to 10.

3. Compounds of claim 2 wherein $R_f$ is perfluoroalkyl of 4 to 12 carbon atoms or perfluoroalkyl of 2 to 6 carbon atoms substituted by perfluoroalkoxy of 2 to 6 carbons;

E is alkylene of 2 to 6 carbon atoms, —CONHCH$_2$CH$_2$—, —CH$_2$CH$_2$N(CH$_3$)CH$_2$CH$_2$—, —CH$_2$CH$_2$SO$_2$NRCH$_2$CH$_2$—, —CH$_2$CH$_2$OCH$_2$CH$_2$—, or —SO$_2$NRCH$_2$CH$_2$—, wherein R is hydrogen, methyl or ethyl and $R_{10}$ is hydrogen or methyl.

4. Compounds of claim 2 wherein $R_f$ is perfluoroalkyl of 6 to 12 carbon atoms;

E is ethylene and $R_{10}$ is hydrogen or methyl.

5. Compounds of claim 2 wherein $R_1$, $R_2$, $R_3$, $R_4$, $R_5$, $R_6$, $R_7$, $R_8$, and $R_9$ are methyl.

6. Compounds of claim 3 wherein $R_1$, $R_2$, $R_3$, $R_4$, $R_5$, $R_6$, $R_7$, $R_8$, and $R_9$ are methyl.

7. Compounds of claim 1 wherein $M_2$ represents acrylic or methacrylic acid esters derived from alcohols of up to 20 carbon atoms, vinyl chloride, vinylidene chloride or chloroethyl vinyl ether.

8. Compounds of claim 7 wherein $M_1$ represents hydroxyalkyl acrylates or methacrylates, N-methylol acrylamide or methacrylamide or N-methylol diacetone acrylamide.

9. Compounds of claim 2 wherein $M_2$ represents acrylic or methacrylic acid esters derived from alcohols of up to 20 carbon atoms, vinyl chloride, vinylidene chloride or chloroethyl vinyl ether.

10. Compounds of claim 9 wherein $M_1$ represents hydroxyalkyl acrylates or methacrylates, N-methylol acrylamide or methacrylamide or N-methylol diacetone acrylamide.

11. Compounds of claim 3 wherein $M_2$ represents acrylic or methacrylic acid esters derived from alcohols of up to 20 carbon atoms, vinyl chloride, vinylidene chloride or chloroethyl vinyl ether.

12. Compounds of claim 11 wherein $M_1$ represents hydroxyalkyl acrylates or methacrylates, N-methylol acrylamide or methacrylamide or N-methylol diacetone acrylamide.

13. Compounds of claim 4 wherein $M_2$ represents acrylic or methacrylic acid esters derived from alcohols of up to 20 carbon atoms, vinyl chloride, vinylidene chloride or chloroethyl vinyl ether.

14. Compounds of claim 13 wherein $M_1$ represents hydroxyalkyl acrylates or methacrylates, N-methylol acrylamide or methacrylamide or N-methylol diacetone acrylamide.

15. Compounds of claim 13 wherein $R_1$, $R_2$, $R_3$, $R_4$, $R_5$, $R_6$, $R_7$, $R_8$, and $R_9$ are methyl.

16. Compounds of claim 1 wherein x and z are integers form 10 to 200;

y is an integer from 1 to 10;

p is an integer from 1 to 100 and q and r are integers from 0 to 75.

17. Compounds of claim 2 wherein x and z are integers form 10 to 200;

y is an integer from 1 to 10;

p is an integer from 1 to 100 and q and r are integers from 0 to 75.

18. Compounds of claim 3 wherein x and z are integers form 10 to 200;

y is an integer from 1 to 10;

p is an integer from 1 to 100 and q and r are integers from 0 to 75.

19. Compounds of claim 4 wherein x and z are integers form 10 to 200;

y is an integer from 1 to 10;

p is an integer from 1 to 100 and q and r are integers from 0 to 75.

20. Compounds of claim 9 wherein x and z are integers form 10 to 200;

y is an integer from 1 to 10;

p is an integer from 1 to 100 and q and r are integers from 0 to 75.

21. Compounds of claim 13 wherein x and z are integers form 10 to 200;

y is an integer from 1 to 10;

p is an integer from 1 to 100 and q and r are integers from 0 to 75.

22. Compounds of claim 15 wherein x and z are integers form 10 to 200;

y is an integer from 1 to 10;

p is an integer from 1 to 100 and q and r are integers from 0 to 75.

* * * * *